Patented June 24, 1924.

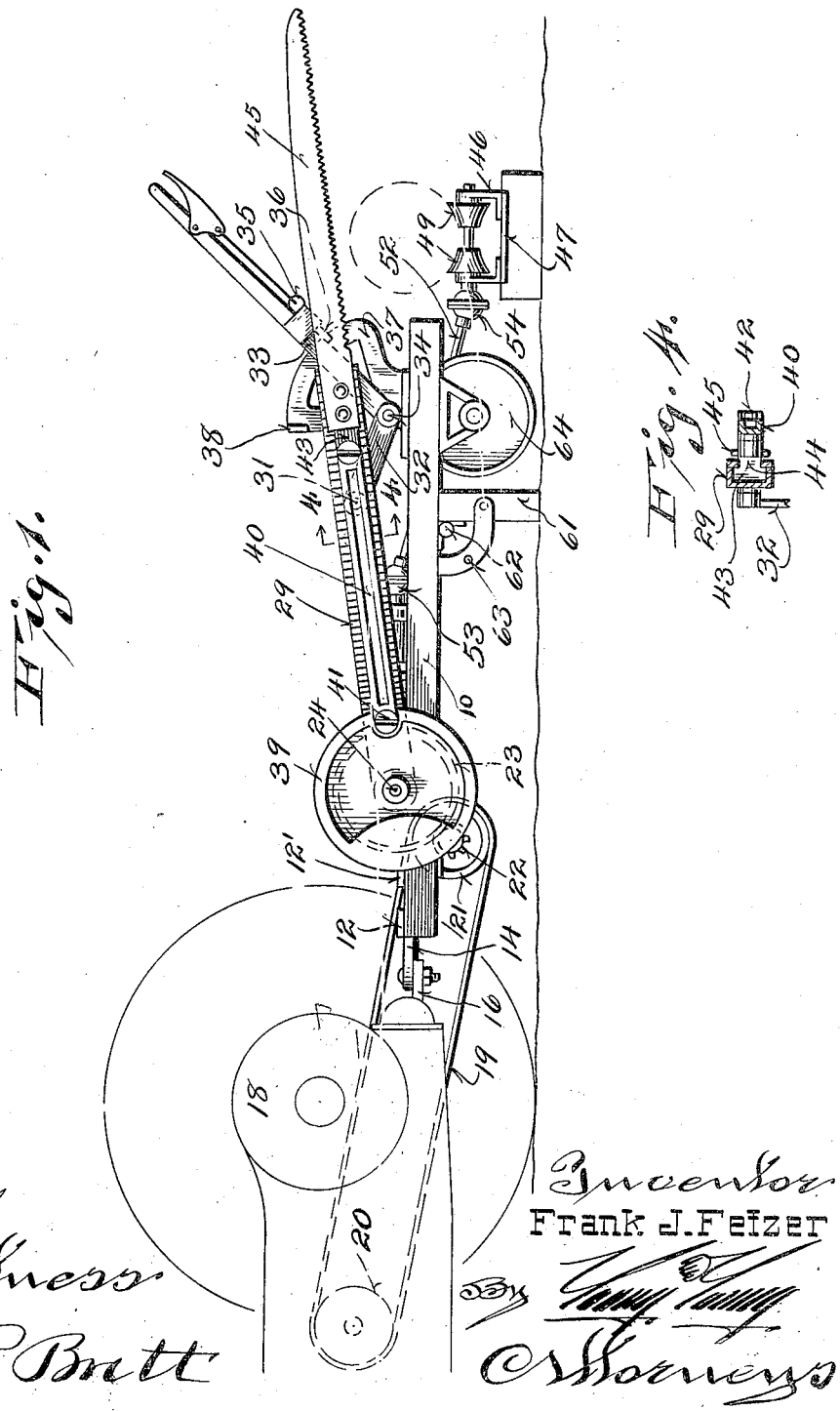

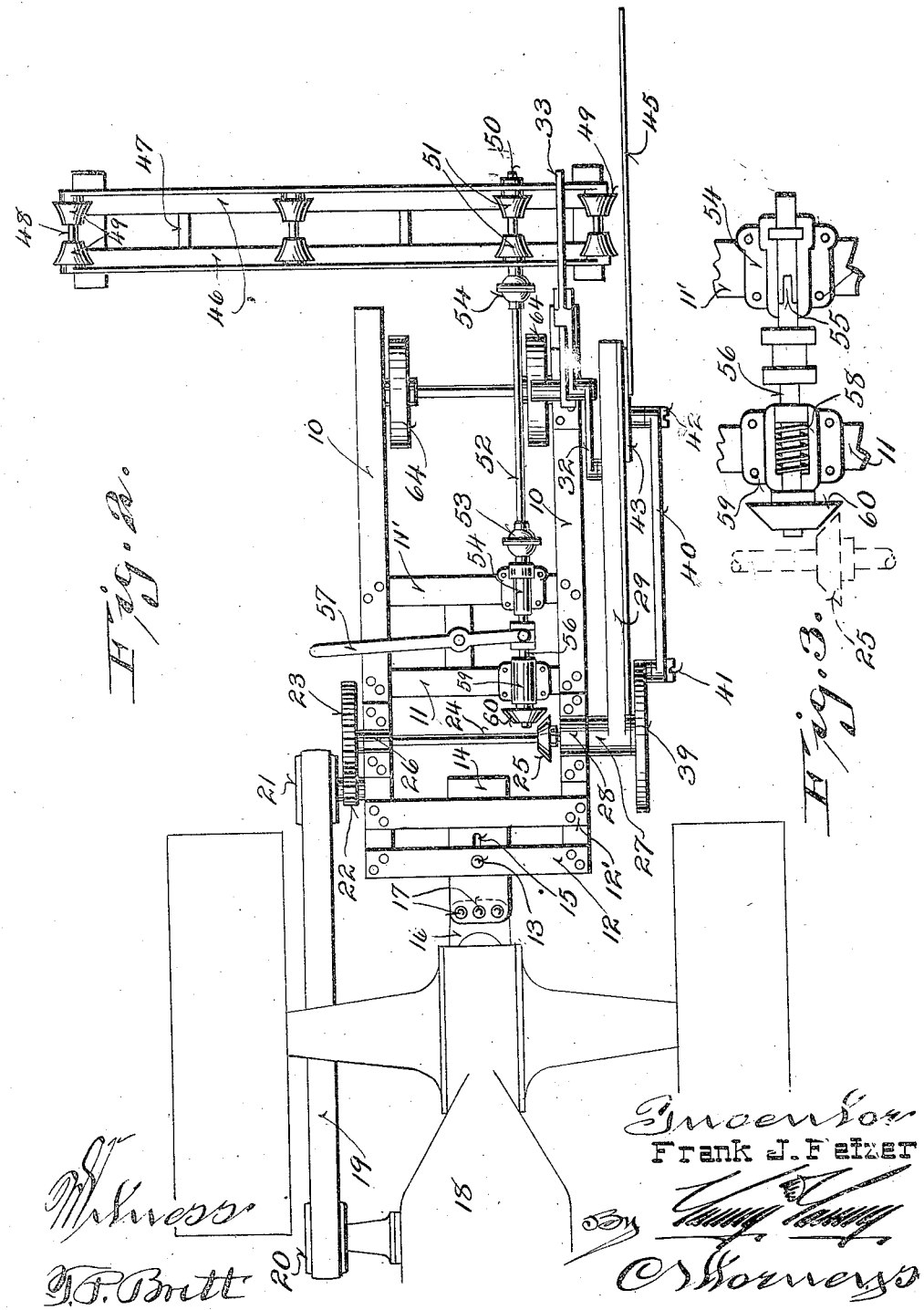

1,499,008

UNITED STATES PATENT OFFICE.

FRANK J. FETZER, OF MANITOWOC, WISCONSIN.

DRAG-SAW ATTACHMENT FOR TRACTORS.

Application filed April 11, 1922. Serial No. 551,542.

*To all whom it may concern:*

Be it known that I, FRANK J. FETZER, a citizen of the United States, and resident of Manitowoc, in the county of Manitowoc and State of Wisconsin, have invented certain new and useful Improvements in Drag-Saw Attachments for Tractors; and I do hereby declare that the following is a full, clear, and exact description thereof.

The invention relates to drag saw attachments for tractors. It comprises a frame attached to the hitch lug of a tractor and supported on wheels, means being provided for reciprocating a saw and a skid being provided having means thereon for advancing logs to position where they may be acted on with the saw.

A primary object of the invention is the provision of a device which is readily portable, the skid being so arranged that it may be deposited readily on the frame and the entire structure may then be carried away and moved from place to place by the tractor.

When it is desired to use the machine, the skid may be placed in operative position in in a moment's time, and the belt adjusted for driving the means for reciprocating the saw. The apparatus will be ready for immediate use.

An important object of the invention is the provision of a machine that is easy to operate. The levers controlling the position of the saw and the means for advancing logs are conveniently disposed and readily manipulable, so that the logs are fed at a desired rate of speed and the sawing action is completely under the control of the operator at all times, no exertion or labor being necessitated.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of the present invention constructed according to the best mode I have so far devised for the practical application of the principles thereof, and in which:

Figure 1 is a side elevation of the entire device in operative position.

Figure 2 is a plan thereof, and

Figure 3 is a detail of a groove.

Figure 4 is a detail of the traveler and guide.

Longitudinal frame members 10—10' are secured together by transverse frame members 11—11' and by spacers 12—12' the spacers being of metal and the rest of the frame being of wood. Spacer 12 is apertured to receive a bolt 13, secured to plate 14, and having slight movement in slot 15. Plate 14 is secured to tractor hitch 16, by bolts 17, having a loose fit so that there is not such rigidity between the attachment and the tractor as to prevent free movement for crests in the road, or irregularities in the land. By means of this slot 15 and bolt 13, the attachment may be adjusted with respect to the tractor 18, so that belt 19 may be suitably adjusted and tensioned on pulleys 20 and 21, whereby power may be transmitted to gear 22, rigid with pulley 21, and gear 23 meshing with gear 22 and rigid with shaft 24, to which friction gear 25 is secured, shaft 24 rotating in bearing 26 and member 27 rotatable in support 28.

Rigid with member 27, is arm 29 to which arm 32 is secured by pin 31, a slot or similar slidable connection being provided in one of the members 29 or 32. Arm 32 is rigid with lever 33, rotatable on pivot 34 and carrying a detent 35, engageable in a notch 36 of standard 37, the lever being limited in its forward movement by lug 38. On the end of shaft 24, a wheel 39 is carried, to which link 40 is secured by pivot 41, the link being secured by pivot 42 to traveler 43, reciprocable in slot 44, so that on the rotation of wheel 39, saw 45, secured to traveler 43 is moved back and forth. Lever 33 is therefore operative to lift arm 29 to position saw 45 properly, detent 35 maintaining the saw in proper position but being manually releasable to permit the saw to descend in its sawing operation until lever 33 abuts against lug 38, thus preventing the saw from striking against the ground.

In order to feed the logs to the proper sawing position, a skid is provided consisting of longitudinal angle irons 46 secured together by transverse members 47, and supporting shafts 48, on which rollers 49 are rotatable. Shaft 50, carrying rollers 51, is rotatable by shaft 52, having universal joints 53 and 54 therein. The forward end of shaft 52 is supported by bearing 54, and is slotted to receive a key 55 on a clutch member 56, movable by lever 57 against the tension of spring 58 contacting with collar 59 to move friction gear 60 against gear 25.

Obviously thru lever 57, the rotation of rollers 51 is controlled so that the log resting thereon, may be advanced at the will of the operator. When it is desired to move the attachment, the skid is rested on the frame, belt 19 being removed, and leg 61 being lifted up on hinge 62 and secured by a pin thru aperture 63, the frame resting on wheels 64. Leg 61 is used during the sawing operation.

Obviously the operation of the device calls for but little labor on the part of the operator. By means of lever 57, the logs are fed to proper sawing position and by means of lever 33, the saw 45 is released, link 40 reciprocating the saw during the sawing operation.

I claim:

1. The combination with a tractor having a power pulley and having a rearwardly projecting tractor hitch, of a drag saw attachment comprising a frame secured to said tractor hitch, wheels carried by said frame adjacent its rear portion, a movable support adapted to lift said wheels from contact with the ground, a reciprocatory saw carried by said frame, mechanism including a pulley adapted to be belted to said first mentioned pulley for reciprocating said saw, and means for supporting logs while they are being sawed.

2. The combination with a tractor having a power pulley and having a rearwardly projecting tractor hitch, of a drag saw attachment comprising a frame secured to said tractor hitch, wheels carried by said frame adjacent its rear portion, a movable support adapted to lift said wheels from contact with the ground, a reciprocatory saw carried by said frame, mechanism including a pulley adapted to be belted to said first mentioned pulley for reciprocating said saw, means for supporting logs while they are being sawed, and a movable skid operatively coupled to said mechanism for advancing and holding said logs in position for sawing.

In testimony that I claim the foregoing I have hereunto set my hand at Manitowoc, in the county of Manitowoc and State of Wisconsin.

FRANK J. FETZER.